United States Patent [19]

Reinhall

[11] 4,002,086
[45] Jan. 11, 1977

[54] DEVICE FOR AUTOMATIC CORRECTION OF UNBALANCE IN RAPIDLY ROTATING MACHINE ELEMENTS

[76] Inventor: Rolf Bertil Reinhall, Killingevagen 16, 181 64 Lidingo, Sweden

[22] Filed: June 25, 1975

[21] Appl. No.: 590,398

Related U.S. Application Data

[63] Continuation of Ser. No. 363,016, May 23, 1973.

[30] Foreign Application Priority Data

June 6, 1972 Sweden .............................. 7433/72

[52] U.S. Cl. ................................ 74/573 F; 51/169
[51] Int. Cl.² ........................................ F16F 15/22
[58] Field of Search .................... 74/573 R, 573 F; 51/169

[56] References Cited

UNITED STATES PATENTS 2,659,243  11/1953  Darrieus ........................... 74/573 F
3,812,274  5/1974  Curtz et al. .................. 74/573 F X

FOREIGN PATENTS OR APPLICATIONS 924,779  5/1963  United Kingdom ................ 74/573

Primary Examiner—Samuel Scott
Assistant Examiner—F. D. Shoemaker
Attorney, Agent, or Firm—Eric Y. Munson

[57] ABSTRACT

Device for counteracting imbalance in a rotary body and automatically restoring it to a balanced condition. The device comprises a fluid-filled bore in which a throttling member moves freely, which transmits the pressure differentials developed about the axis of rotation during rotation of the body to a balancing mass movable in chambers disposed about the bore to displace the balancing mass a distance proportional to the pressure differentials and is effective upon the balancing mass to restore the body to balanced condition.

13 Claims, 4 Drawing Figures

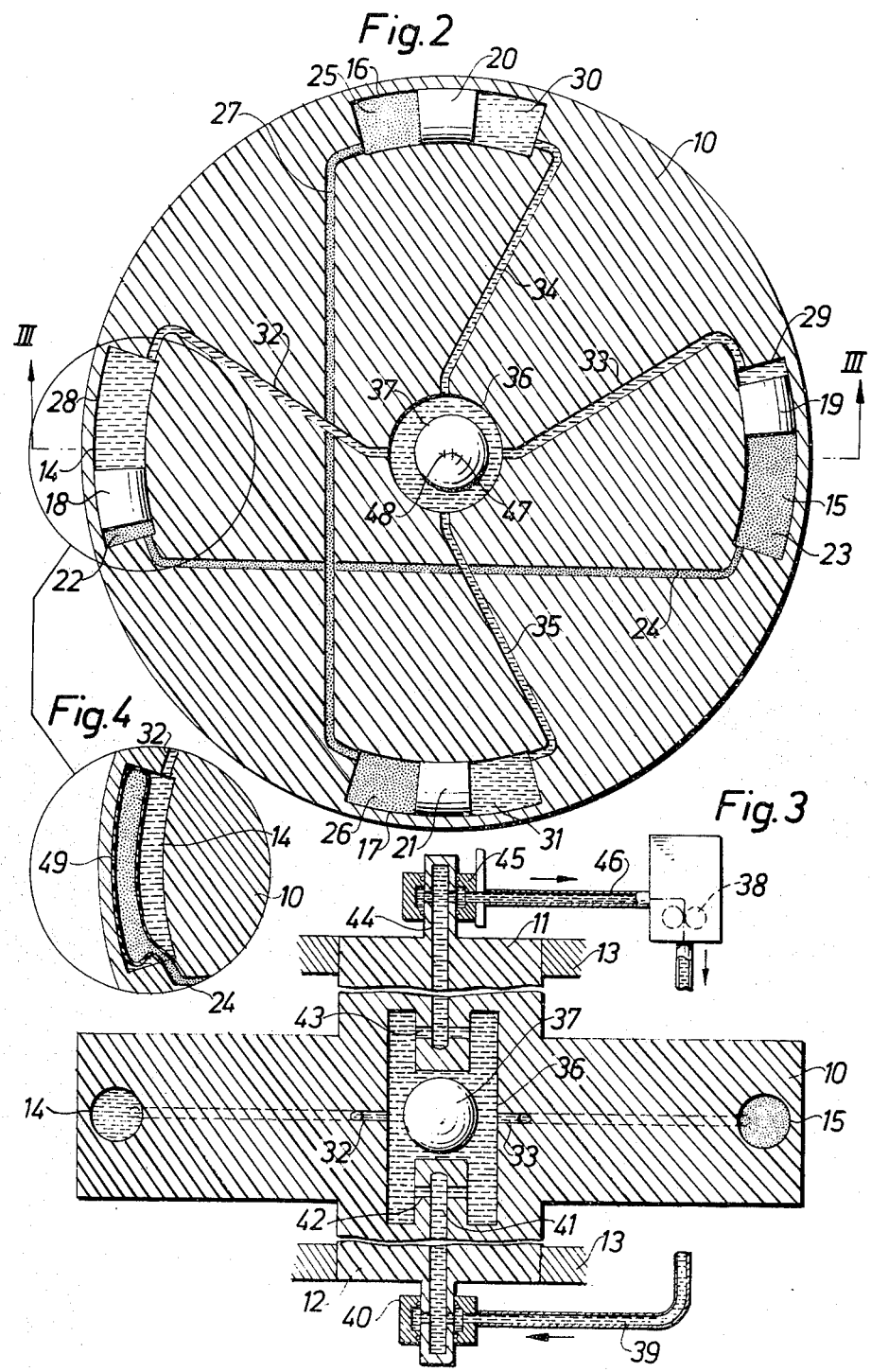

DEVICE FOR AUTOMATIC CORRECTION OF UNBALANCE IN RAPIDLY ROTATING MACHINE ELEMENTS

This is a continuation of application Ser. No. 363,016 filed May 23, 1973.

FIELD OF THE INVENTION

This invention relates to a device for automatic correction of imbalance in rapidly rotating machine elements.

More particularly this invention relates to a device for automatic correction of imbalance in rapidly rotating machine elements caused by unequal distribution of weight within the rotating element.

THE PRIOR ART

Machine elements subjected to high rotational speeds require very exact dynamic balancing of the rotating element in order to avoid that members carrying said element, such as bearings and shafts, are exposed to undesirable loads and stresses and deflecting forces. The balancing is usually effected by measuring, by means of specific apparatus, the magnitude of the imbalance and defining the position of the same whereafter the weight distribution in the element is adjusted correspondingly.

OBJECTS OF THE INVENTION

One main object of the invention is to provide for correction of such imbalance when it develops during rotation of the element without having to stop of operation. Such disturbances in the balance can arise e.g. by the machine element being subjected to wear of various magnitude about the circumference during operation. One example in this respect are grinding discs for disintegration of wood chips or other fibrous material, which discs, usually in pairs, facing one another rotate with high speed relative one another while the material passes through the narrow interspace between them. The invention makes use of the phenomenon that when a liquid rotates together with the machine element and when a solid body having a lower weight than the volume of liquid displaced by the body is located in the liquid, said body always takes a position in alignment with the central axis of rotation of the system. This phenomenon is explained by the fact that the pressure within a rotating quantity of liquid is directly proportional to the spacing from the center of rotation. Due to its lower specific weight the body placed in the liquid is in a position of equilibrium in which the pressure forces emanating from the liquid and acting on the opposite sides of the body entirely balance one another. Thus, if the machine element due to imbalance has its center of rotation displaced from its theoretical center, the body will continue to rotate about such theoretical center of rotation.

MAIN FEATURES OF THE INVENTION

In accordance herewith, it is one main feature of the invention to provide a central space participating in the rotation of the elements which contains firstly a liquid and secondly a body movable within said liquid and having a lower volume by weight than said liquid, which body constantly maintains its position of equilibrium with its center of gravity in alignment with the theoretical center of rotation of the element so that when imbalance in the system develops, its position in said central space is changed, to thereby actuate means for displacing a balancing mass thus counteracting the imbalance.

According to an especially valuable embodiment of the invention the central space forms part of a closed circuit or path for circulating the liquid, in which throttling of the liquid flow in an interspace or play about the circumference of the body in response to an unbalanced condition occurring in the system is utilized for displacing the balancing mass.

According to another particularly suitable embodiment of the invention the body is shaped as a rotary body designed to cooperate with a slot-shaped interspace in the central space which has a circular cross-section. The initiation of the displacement of the balancing mass may be effected by hydraulic, mechanical or electric means, and the mass may be a liquid or a solid body.

SHORT DESCRIPTION OF THE DRAWINGS

Further objects, features and advantages of the invention will become apparent from the following description, considered in connection with the accompanying drawings, which form part of this specification and of which:

FIG. 2 is a sectional view of the disc perpendicular to the shaft thereof.

FIG. 3 is a sectional view following the line III—III of FIG. 2.

FIG. 4 shows a modified embodiment of the invention.

DETAILED DESCRIPTION OF A PREFERRED EMBODIMENT

Figure 1:
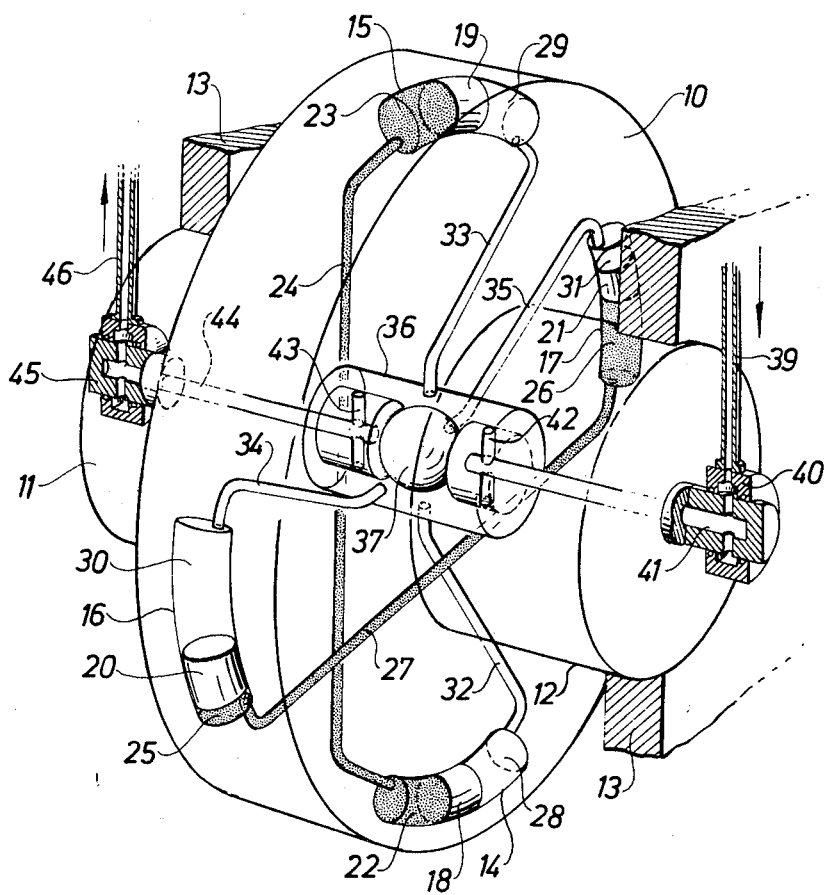
FIG. 1 is a perspective view of a balancing system embodying the features of the invention as applied to a rotary disc.

Referring to the drawings, and in particular FIGS. 1, 2 and 3, reference numeral 10 denotes a disc which by two journals 11, 12 is supported in a stationary bearing members 13. Formed in the disc 10 is an even number of cylinders spaced evenly from the center of rotation and in pairs disposed diametrically opposite one another. In the illustrated case the number of cylinders is four, the cylinders 14 and 15 forming one diametrically opposed pair as do the cylinders 16 and 17. The cylinders have circular cross-section and their axis lines follow a circular line having as its center the center of the disc. In the embodiment according to FIGS. 1 through 3, each cylinder houses a movable, sealing piston 18, 19, 20 and 21, respectively, which pistons divide each associated cylinder into two chambers separated from one another. The chambers 22, 23 of the cylinders 14 and 15 are interconnected by a duct 24 to form a closed system containing a particularly heavy liquid such as mercury. In the same manner the chambers 25 and 26 of the cylinders 16 and 17, respectively, are interconnected by a duct 27 to form a closed system which is filled with a heavy liquid such as mercury.

Starting from the chambers located at the opposite side of each piston and denoted 28, 29, 30 and 31, respectively, are ducts 32, 33, 34 and 35, respectively, which extend to the defining surface of a central space having the form of a cylindrical room 36 within which is disposed a throttling member 37 having the shape of a ball or other rotary body. The ball 37 has a smaller diameter than the central room 36 so that a free interspace or play exists about the circumference of the ball 37 into which interspace the four ducts 32 through 35 open in the same peripheral positions relative one another as those of the chambers 28 through 31.

The central room 36 forms part of a closed circulation circuit or path which includes a stationary pump aggregate 38 (FIG. 3) from the pressure side of which extends a duct 39 which over a sealing device 40 communicates with a central channel 41 formed in the journal 12 and through channels 42 in communication with the cylindrical room or bore 36 laterally of the valve member 37. On the other side of the valve member, viewed in the axial direction, similar channels 43 are formed which, via an axial channel 44 formed in the journal 11, a sealing device 45 and a duct 46 are connected to the suction side of the stationary pump aggregate 38. The duct circuit just described is filled with a liquid circulating between the pump aggregate and the room 36 within which it is subjected to a throttling action on its passage through the slot-shaped interspace between the ball 37 and the cylindrical wall of the room 36. As already mentioned, this slot-shaped interspace is located directly in front of the openings of the ducts 32–35 into the room 36 and is thus filled with the same liquid as the chambers 28–31. This liquid is lighter than the liquid filling the opposite chambers 22–25 of the cylinders 14, 17, and it may consist of oil. The rotary body 37 has a lower volume weight than that of the liquid in room 36 and to this end may be hollow.

The center of rotation defined geometrically or by balancing is denoted in FIG. 2 by the reference numeral 47 which means that as long as the element 10 rotates about this center, perfect equilibrium balance exists. If now e.g. due to uneven wear, the geometrical center of rotation of the element is displaced to the axis indicated at 48, the rotating ball 37 will continue to rotate about the initial center of rotation 47 of the system, which means that the ball 37 will take an excentric position within the room 36. In FIG. 2 it is assumed that the interspace between the ball and the mouth of the duct 32 has become greater than the interspace in front of the diametrically opposed duct 33. It is further assumed that imbalance has been produced in this direction only which means that the spacing between the ball and the mouths of the ducts 34, 35 has remained unchanged. Due to the reduction of width of the interspace in front of the mouth of the duct 33, the liquid circulated by the aggregate 38 axially past the ball 37 will be imparted greater velocity than before and thereby lower pressure. On the other hand, the liquid pressure is increased and the velocity of the liquid is reduced in the widened interspace in front of the mouth of the channel 32. These changes will cause the circulating liquid to create a higher pressure in the chamber 28 of the cylinder 14 than in the chamber 29 of the cylinder 15 so that the pistons 18 and 19 are displaced and mercury is forced over from chamber 22 into chamber 23. By this displacement more mass is transferred into the cylinder 15 and the imbalance is being reduced until the body 10 has regained its theoretical or initial center of rotation 47.

In this way, every imbalance occurring at any portion of the circumference on the disc 10 can be cured by redistribution of the quantity of the heavy liquid in the chambers 22, 23, 25, 26. Due to the fact that the centre lines of the cylinders 14–17 follow circular arcs, the liquids located in the various chambers will, independently of the distribution, maintain the location of their gravity centers unchanged in relation to the center of rotation.

DESCRIPTION OF PREFERRED VARIATIONS

The embodiment illustrated in FIG. 4 differs from the preceding one by the feature only that the two liquids in the cylinders are separated from one another by a bag 49 which thus internally is filled with the one medium, such as the mercury, and on its other side is in contact with the other medium, such as the lighter liquid.

The change in pressure, which the liquid flowing through the interspace between the rotary body 37, such as the ball or roll and the surface defining the central space 36, is subjected to at various portions of the circumference as a consequence of imbalance appearing in the system, may also be utilized to start motors which in turn actuate balancing masses having the shape of solid bodies to take new positions in the machine element for correcting the imbalance. The invention is also useful in such cases where a complete balancing of the element prior to starting the machine will cause complications or would be inconvenient or impossible to carry out.

It is not essential for the invention that a liquid flows through a slot-shaped interspace surrounding the body 37, but the bore or central room 36 may be closed, the body then being caused to cooperate with e.g. electrical contact means disposed about the circumference which, by closing an electric circuit cause a servo motor to to operate and thereby displace a balancing body such as a screw or a piston into a new position at that place where imbalance has appeared. In such a case the body 37 need not have spherical or cylindrical configuration.

While several embodiments of the invention have been shown and described, it is to be understood that this is for purpose of illustration only, and that the invention is not to be limited thereby, but its scope is to be determined by the appended claims.

What is claimed is:

1. A device for counteracting imbalances in a rotary body and automatically restoring it to be balanced condition, comprising:
   a. an axial bore in said rotary body forming a reservoir and containing a fluid medium;
   b. a plurality of chambers disposed about said bore at spaced distances therefrom and each having a balancing mass movable therein;
   c. means floating freely in said fluid containing reservoir for developing pressure differentials about the axis of rotation proportional to any imbalances arising during rotation of said body;
   d. means for transmitting said pressure differentials to said balancing masses to displace the latter in said chambers a distance proportional to the pressure differentials and being effective to restore said body to a balanced condition.

2. A device according to claim 1, in which the means for transmitting the pressure differentials to said balancing masses comprises the fluid medium from said reservoir.

3. A device according to claim 2, in which the fluid medium is transmitted by means of a circuit connecting said reservoir and said chambers;

4. A device according to claim 1, in which said floating means for developing pressure differentials comprises a ball having a lower specific weight than the fluid medium in said reservoir.

5. A device according to claim 3, in which said reservoir is connected to a source for supplying the fluid medium by means of a pump for circulating the fluid medium through said circuit.

6. A device for counteracting imbalances in a rotary body and automatically restoring it to a balanced condition, comprising:
   a. an axial bore in said rotary body forming a reservoir and containing a fluid medium;
   b. a plurality of opposed circumferentially disposed chambers and each having a balancing mass movable therein and being provided with pressure-yielding partition means dividing said mass into two separate portions having different densities;
   c. means floating freely in said fluid containing reservoir for developing pressure differentials about the axis of rotation proportional to any imbalances arising during rotation of said body;
   d. means for transmitting said pressure differentials to one portion of said balancing masses to displace said portion in said chambers a distance proportional to the pressure differentials; and
   e. means effective to displace the other portion of said balancing masses in the opposed chambers a distance sufficient to restore said body to a balanced condition.

7. A device according to claim 6, in which the portion of the balancing masses to which the pressure differentials are transmitted comprises the fluid medium from said reservoir.

8. A device according to claim 7, in which the fluid medium is transmitted by means of a circuit connecting said reservoir and said chambers.

9. A device according to claim 7, in which the other portion of the balancing mass comprises a fluid medium heavier than the fluid medium in said reservoir.

10. A device according to claim 9, in which said heavier fluid medium is transmitted from one of said chambers to the opposing chamber by means of a circuit interconnecting said chambers.

11. A device according to claim 6, in which said yielding partition means comprises a piston movable in said chambers.

12. A device according to claim 6, in which said floating means for developing pressure differentials comprises a ball having a lower specific weight than the fluid medium in said reservoir.

13. A device according to claim 8, in which said reservoir is connected to a source for supplying the fluid medium by means of a pump for circulating the fluid medium through said circuit.

* * * * *